(12) United States Patent
Diener et al.

(10) Patent No.: US 8,596,900 B2
(45) Date of Patent: Dec. 3, 2013

(54) ARTICULATED AND/OR BEARING UNIT

(75) Inventors: Andre Diener, Osnabruck (DE); Reinhard Richter, Bohmte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 252 days.

(21) Appl. No.: 12/527,209

(22) PCT Filed: Feb. 5, 2008

(86) PCT No.: PCT/DE2008/000201
§ 371 (c)(1),
(2), (4) Date: Aug. 14, 2009

(87) PCT Pub. No.: WO2008/101462
PCT Pub. Date: Aug. 28, 2008

(65) Prior Publication Data
US 2010/0109274 A1    May 6, 2010

(30) Foreign Application Priority Data
Feb. 21, 2007    (DE) .......................... 10 2007 008 959

(51) Int. Cl.
*F16C 11/10*    (2006.01)
(52) U.S. Cl.
USPC ............... 403/135; 403/31; 403/36; 403/37; 403/61; 403/115
(58) Field of Classification Search
USPC ............ 403/59, 61, 76, 114, 115, 127, 135, 403/137, 138, 132, 145, 146, 31, 36–39; 280/93.511, 124.155, 124.147; 92/187
See application file for complete search history.

(56) References Cited

U.S. PATENT DOCUMENTS

| | | | | |
|---|---|---|---|---|
| 2,207,088 | A * | 7/1940 | Coleman | 267/64.26 |
| 3,245,706 | A * | 4/1966 | Rowlett | 403/135 |
| 3,447,796 | A * | 6/1969 | Van Winsen | 267/256 |
| 6,042,294 | A | 3/2000 | Urbach | |
| 6,454,484 | B1 * | 9/2002 | Parker et al. | 403/132 |
| 6,568,870 | B2 | 5/2003 | ICaza Acereto | |
| 7,305,864 | B2 * | 12/2007 | Graber et al. | 73/11.04 |
| 2007/0212165 | A1 * | 9/2007 | Rechtien et al. | 403/132 |

FOREIGN PATENT DOCUMENTS

| | | |
|---|---|---|
| DE | 2 145 114 | 3/1973 |
| DE | 35 23 912 A1 | 1/1987 |
| EP | 0 206 131 A1 | 12/1986 |
| JP | 2000199540 A | 7/2000 |

* cited by examiner

*Primary Examiner* — Daniel P. Stodola
*Assistant Examiner* — Jonathan Masinick
(74) *Attorney, Agent, or Firm* — Davis & Bujold, PLLC; Michael J. Bujold

(57) ABSTRACT

An articulation and/or bearing device (1) with a pivot pin (2) whose head area (3), in the assembled condition, is held in a receiving joint cup (4) and, together with the latter, can move axially relative to an accommodating space that acts as a housing (5), is designed such that in relation to the axial movement of the joint cup (4) within the housing (5), the articulation or bearing device (1) acts as a gas pressure spring and/or damper.

15 Claims, 3 Drawing Sheets

ARTICULATED AND/OR BEARING UNIT

This application is a National Stage completion of PCT/DE2008/000201 filed Feb. 5, 2008, which claims priority from German patent application serial no. 10 2007 008 959.9 filed Feb. 21, 2007.

FIELD OF THE INVENTION

The invention concerns an articulation and/or bearing device and a motor vehicle with one or more such articulation and/or bearing device(s), in particular, in the chassis and/or steering areas thereof.

BACKGROUND OF THE INVENTION

In the context of articulation devices, particularly in wheel carriers or similar chassis areas, the problem arises, on the one hand, of being able to locate the fitted position of a joint cup that receives a head area of the pivot pin while compensating for manufacturing tolerances, in such manner that the said fitted position of the joint is optimized for the conditions that occur during driving; on the other hand, it should also be possible to adjust the position of the head of the joint in response to dynamic loads during driving operation, to enable stress-free connection of the chassis components.

SUMMARY OF THE INVENTION

The invention addresses the problem of being able to optimize the axial position of the joint cup in its housing.

The invention provides an articulation and/or bearing device in which the joint cup, that receives a head area of the pivot pin, can undergo a defined amount of axial movement within its housing. In this way, allowance can be made both for manufacturing tolerances, relative to the optimum axial joint orientation, and for dynamic loads.

If the space between the joint cup and an end of the housing can be closed off to form a pressure-tight space and a gas contained therein can be compressed by axial movement of the joint cup, this ensures a lasting spring and/or damping function of the device. The closure, to form a pressure-tight space, can be achieved either by subsequent fitting of a cover to the housing and/or, in particular to dispense with the need for a separate housing, by using a valve, for example in the cover or in a wall of the housing. In either case, ventilation of this space, during assembly, is made possible so that the head and the joint cup can be positioned axially, as desired, without having to work against the pressure of a compressed gas during assembly. In this way, during production, above all the manufacturing tolerances can also be allowed for.

The then pressure-tight space can be filled with a compressible gas, after assembly for example, with this gas being under normal pressure within the housing when a cover is fitted. On the other hand, a gas can be introduced under considerable over-pressure by using a valve to regulate the gas-filling process.

If a cover is provided to close off the housing, it is advantageous to provide the cover with a convexity to make it more rigid, in particular directed toward the joint cup so that a force directed outward can act in opposition to a gas under excess pressure. Such a cover can also serve as a mechanical stop that limits the axial movement of the joint cup.

The use of a valve, however, enables the pressure-tight space to be made integrally, in other respects, so that for certain applications, advantageously no separate housing has to be provided, but rather, the housing can also be formed as a recess in a functional component, in particular a wheel carrier or similar guiding element, so that production is made easier and fewer components are involved.

With the invention, during assembly, it is both possible to adjust the axial position of the "piston" formed by the joint cup, and to adjust the stroke length available for it, for example by virtue of the pressure of the gas introduced or by means of adjustable stops. Thus, the joint cup holding the head area of the pivot pin can advantageously be fitted into the housing in an axially central assembly position and, from this assembly position, it can move in both axial directions through a stroke length of 2 to 5 millimeters.

The pressure-tight space can also subsequently be filled to a volume of 25 to 50% with grease, possibly again by means of a valve. This facilitates maintenance. The grease lubrication can be applied effectively both between the ball head and the joint cup, and also between the joint cup and the housing, in the latter case with a sealing action. By virtue of an over-pressure or under-pressure in the pressure-tight space, lubricant movement can take place as a function of the dynamic conditions, whereby its function is ensured at all times even during operation.

BRIEF DESCRIPTION OF THE DRAWINGS

Other advantages and features of the invention emerge from the example embodiments of the object of the invention illustrated in the drawing and described below.

The drawings show.

DETAILED DESCRIPTION OF THE PREFERRED EMBODIMENTS

Figure 1:
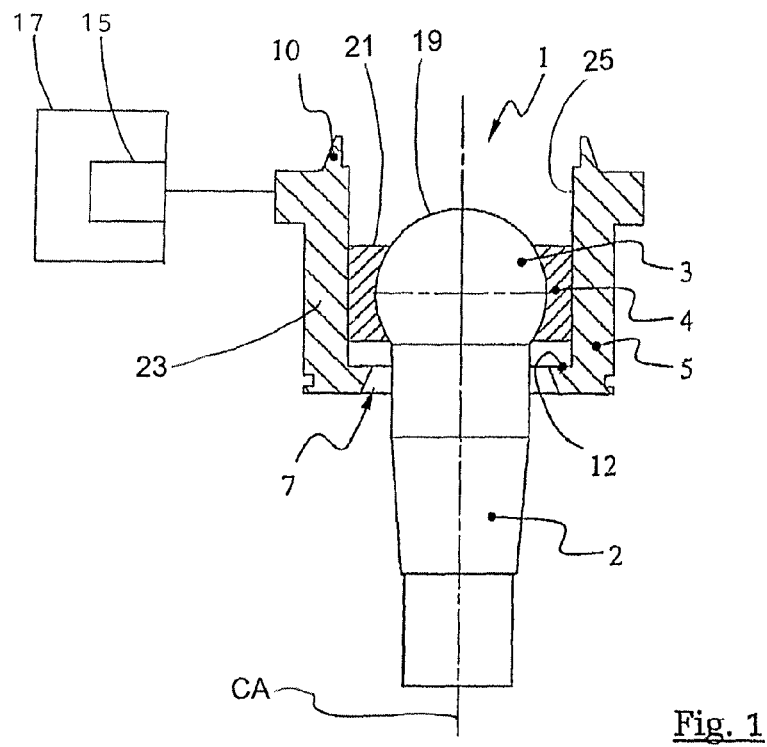
FIG. 1: A schematic sectioned view of an articulation and/or bearing device, according to the invention, during assembly but before the later closing of the pressure-tight space.
Figure 2:
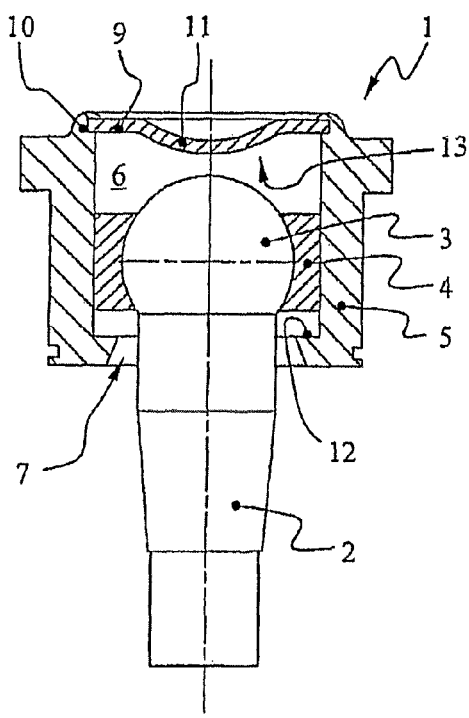
FIG. 2: A view similar to that of FIG. 1, after the closure of the pressure-tight space and with the joint cup in an axially central position.

An example of an articulation device 1 according to the invention, as illustrated in FIG. 2, comprises an axially extended pivot pin 2 with a head area 3 that is expanded, for example, formed essentially in the shape of a ball and has an outer surface 19 (FIG. 1). This can be held, as a rule, in and against a permanently lubricated joint or bearing cup 4, which has an upper surface 21 (FIG. 1) and receives the head area and in which the latter can move. The joint cup 4, shown here, is substantially annular but it could also be essentially closed, except where the pin passes through it.

If necessary, the joint cup 4 can be made, for example, from an fiber-reinforced plastic such as PA, POM, PBT, PEEK or cross-linked forms of those materials (for example cross-linked by electron irradiation), or else as a casting or from hardened steel or from an alloy of a non-ferrous metal, such as copper.

Furthermore, for its part the joint cup 4 is held radially on the outside and axially in a housing 5 which has a laterally surrounding wall 23 with an interior surface 25 (FIG. 1). The housing 5 need not be a separate assembly but can also be an integral part of a control element, such as a wheel carrier, which encloses the articulation device 1 in the assembled condition, for example.

Such a control element can be made, for example, by injection molding or casting of a hot, molten material, such as a zinc pressure diecasting, for example, so that after subsequent cooling in a mold, the control element is solid and of stable shape which can form an integral housing 5 without any further finish-processing.

The articulation and/or bearing device 1 also comprises a sealing sleeve, which is often formed as a sealing bellows and is not illustrated here. It is connected in the area of the passage 7 left open in the housing 5 for the pin 2.

The joint 1 shown in the example embodiment allows as axial play Δs. This play is needed, on the one hand, for assembly and dismantling when, for example, the control element is inside the chassis. On the other hand, it also allows some axial movement of the joint cup 4, relative to the housing during operation, with the head area 3 of the pivot pin 2 held in it.

To allow the desired, tolerance-compensating axial positioning of the bearing cup 4 along the central axis CA holding the pin head 3 in it, after assembly (FIG. 1), the space 6 between the joint cup 4 and an end 13 of the housing 5 can be closed off to form a pressure-tight space (FIG. 2). A gas contained therein, after its closure, can be compressed by axial movement of the joint cup 4, and oppose such movement with a springy and/or damping effect.

Accordingly, owing to this gas compression, the articulation or bearing device 1 acts, during operation, as a pressurized gas damper and/or spring in relation to the axial movement of the joint cup 4 within the housing 5.

On the other hand, during assembly the space 6 is still ventilated, for example by opening a valve 8 (FIG. 6) or because the end cover 9 has not yet been fitted. So the joint cup 4, already holding the pin head 3, can be pushed into the housing 5 like a piston without having to work against a gas reservoir present therein, which would be extremely difficult because of the only small forces during assembly. This would make it impossible to position the "piston" 4 exactly in a central location, as shown in FIG. 2.

According to the invention, the joint cup 4 can be positioned in different places and very accurately. In most cases, a central position is chosen during assembly.

Thus, at the end of assembly, the closing of the housing 5 is particularly important. In the example embodiment, the joint cup 4 can move axially away from the central position illustrated, upward or downward by about 3.5 millimeters in each case. A substantial part of this stroke path is needed for tolerance compensation, during assembly of the parts of the articulation 1 to be joined, and in this case the axial displacement path needed in connection with dynamic loading typically amounts to about one millimeter.

Figure 6:
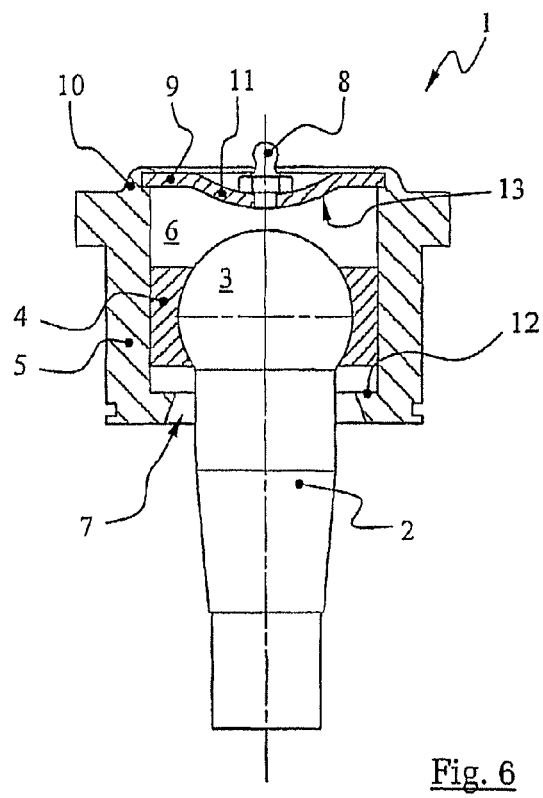
FIG. 6: A view similar to that of FIG. 2, with an additional valve provided in the cover.

Once sealed, the pressure-tight space 6 can be filled with compressible ambient air under normal pressure. It can also be filled with an inert gas and/or air or another gas under excess pressure, particularly when, as shown in FIG. 6, the pressure-tight space is provided with a valve 8 for regulating the gas-filling process. The gas pressure can also be subsequently adjusted for maintenance purposes or if requirements change. This or another valve can also be used for initial or subsequent filling of the space 6 with a lubricant, such as a high-viscosity grease. The amount of lubricant introduced depends on the desired gas spring characteristics. Typically, the closed space 6 is filled with grease to a volume of about 25 to 50%.

The pressure-tightness of the space 6 must not only be sufficient to contain the gas present in it under static excess pressure, but also to withstand surges due to dynamic loading. The sealing action can be enhanced by the lubricant, which then fulfills a dual function.

In the figures shown in the drawing, the seal consists of a separate cover 9 which, at the end of the assembly process, is placed over an axially open annular flange 10 of the housing 5 and secured by bending the said annular flange 10 over it (transition from FIG. 1 to FIG. 2).

The cover 9 is provided with a convex curvature 11 to increase its rigidity, which faces toward the direction of the joint cup 4 so as to counteract the increased internal pressure sporadically produced at least during dynamic loading.

As already mentioned earlier, as an alternative, the pressure-tight space 6 can be enclosed by a housing 5 whose lateral surrounding walls and end cover are formed integrally with one another, for example, when the said housing 5 is formed as part of a wheel carrier.

Figure 3:
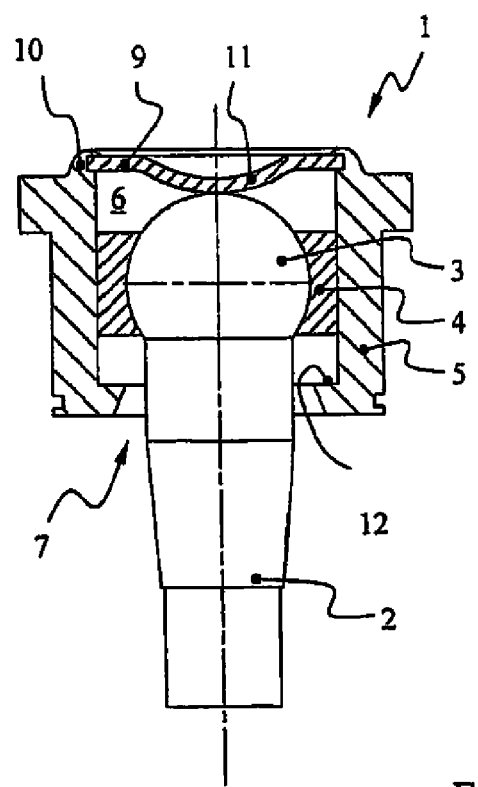
FIG. 3: A view similar to that of FIG. 2, with the axially movable head area stopped against the cover.
Figure 4:
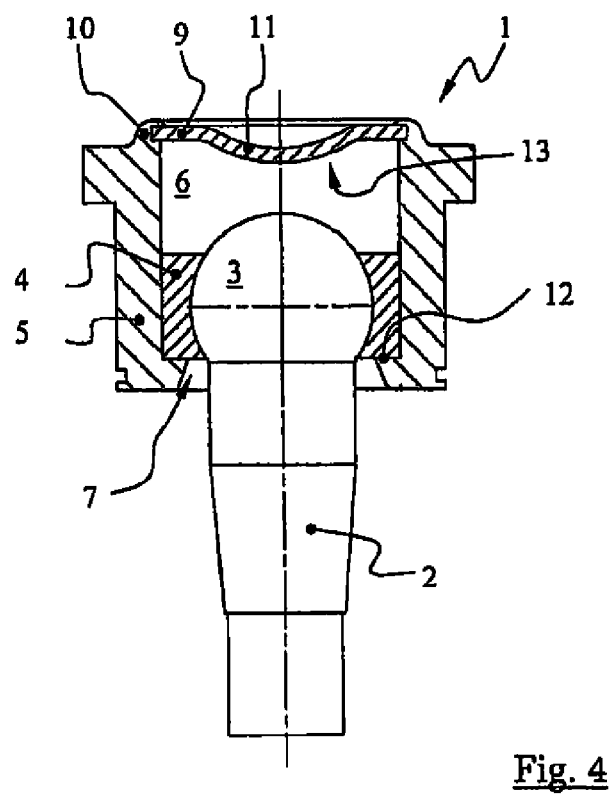
FIG. 4: A view similar to that of FIG. 3, with the axially movable head against an edge of the housing opposite the cover.

The end cover 9, shown in the present case, constitutes a stop for axial movement of the joint cup 4 within the housing 5. This stop position is illustrated in FIG. 3. For that purpose, the cover 9 has a substantial wall thickness, for example, 1 to 3 millimeters when made of steel. If the stroke path were not limited by this stop, there would exist a risk that the sealing bellows might be pulled too deeply into the housing 5. The stop 12, on the opposite side, is formed by a section of the inner wall of the housing 5 itself, as shown in FIG. 4. This restriction of the movement by the stops can also eliminate the need for an over-pressure valve.

Figure 5:
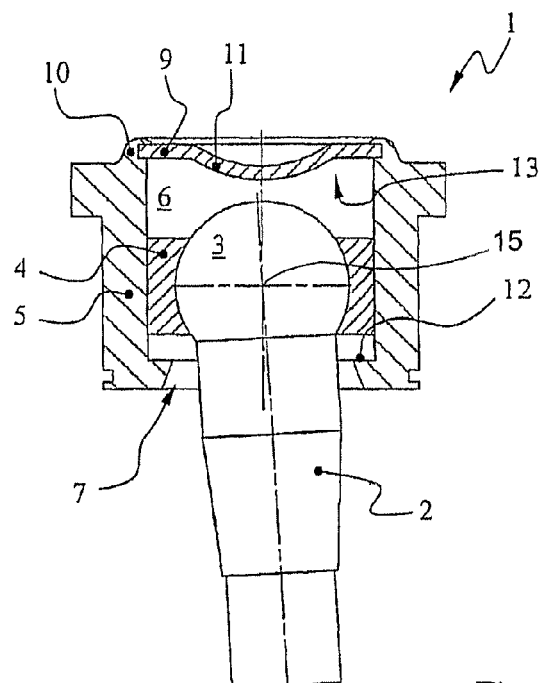
FIG. 5: A view similar to that of FIG. 2, with the pivot pin swiveled radially outward.

FIG. 5 shows a momentary deflection of the pin 2 which can pivot about the center point 17 of the head 3. Alternatively, it can also be permanently fitted obliquely in the housing 5.

The articulation or bearing device 1 can, for example, be provided with an outer thread for screwing into a holder. Alternatively, it can be press-fitted and secured axially.

In the form described according to the invention, such articulation and/or bearing devices 1 can advantageously be used, in particular, in chassis and/or steering components 15 of motor vehicles 17, to compensate production and structural tolerances both between the articulation itself and a wheel carrier, and between the individual components of the articulation 1 itself during assembly into the vehicle, and also to accommodate dynamic loads.

LIST OF INDEXES

1 Articulation or bearing device
2 Pin
3 Head area
4 Joint cup
5 Housing
6 Pressure-tight space
7 Passage opening
8 Valve
9 End cover
10 Annular flange
11 Convex curvature
12 Stop
13 Front end

The invention claimed is:
1. An articulation device (1) comprising:
a pivot pin (2) with a spherical head area (3) having a center point, in an assembled condition, the head area (3) of the pivot pin (2) is retained within a housing (5) by a receiving joint cup (4), the housing defining a longitudinal axis, the joint cup (4) engages and radially, captively surrounds a maximum diameter of the head area (3), the maximum diameter of the head area (3) passes through the center point, and the head area is retained by the joint cup within the housing such that the center point is fixed along the longitudinal axis, and the joint cup has a cross sectional profile that is symmetric in relation to a lateral line that extends through the center point of the head area and is normal to the longitudinal axis, the joint cup (4) and the head area (3) of the pivot pin (2) being axially slidable together within an accommodating space and relative to the housing (5), the housing (5) radially delimits the accommodating space, in relation to axial sliding movement of the joint cup (4) and the head area of the pivot pin within the housing (5), the articulation device (1) acts as at least one of a gas pressure spring and a damper, the accommodating space is axially delimited at a lower end thereof by the joint cup (4) and the head area of the pivot pin and at an upper end of the accommodating space by an end cover of the housing (5), and the accommodating space is a pressure-tight space (6);

a gas is contained within the pressure-tight space (6) and compressed by the axial sliding movement of the joint cup (4) and the head area (3) of the pivot pin (2) toward the end cover of the housing (5), and the end cover (9) is fixed at the upper end of the accommodating space to the housing (5) and the end cover (9) has a convex curvature (11) that forms a stop which can directly abut against the head area (3) so as to prevent further axial sliding movement of the joint cup (4) within the housing (5), and the head area of the pivot pin is directly exposed to the pressure-tight space.

2. The articulation device (1) according to claim 1, wherein the pressure-tight space (6) is filled with a compressible gas and is axially defined by the end cover (9) and an upper surface of the joint cup (4) facing the end cover and an upper surface of the head area (3) of the pivot pin facing the end cover, the head area of the pivot pin is at least semispherical.

3. The articulation device (1) according to claim 1, wherein the pressure-tight space (6) includes a valve (8) which facilitates filling the pressure-tight space (6) with gas.

4. The articulation device (1) according to claim 1, wherein the pressure-tight space (6) is filled with an inert gas under pressure.

5. The articulation device (1) according to claim 1, wherein the pressure-tight space (6) is radially delimited by a lateral surrounding wall of the housing (5), and the end cover and the lateral surrounding wall of the housing are formed integrally with one another.

6. The articulation device (1) according to claim 1, wherein the housing (5) is formed as a recess in a wheel carrier or a guiding element.

7. The articulation device (1) according to claim 1, wherein the joint cup (4) retains the head area (3) of the pivot pin (2) within the housing (5) such that both the joint cup (4) and the head area (3) are axially slidable in both axial directions along the longitudinal axis, the axial sliding movement of the joint cup and the head area of the pivot pin is limited to a stroke path of between about 2 to 5 millimeters.

8. The articulation device (1) according to claim 1, wherein the pressure-tight space (6) is filled with grease to a volume of 25 to 50%.

9. The articulation device (1) according to claim 1, wherein the articulation device (1) is connected to at least one of a chassis component and a steering component of a motor vehicle.

10. The articulation device (1) according to claim 1, wherein the pressure-tight space (6) is radially delimited by an inner surface of a laterally surrounding wall of the housing (5) and the end cover and the surrounding wall are formed integrally with one another, the pressure-tight space is axially delimited at a lower end of the pressure-tight space that is formed by a combination of an axially upper surface of the joint cup and an axially upper surface of the head area of the pivot pin, and the pressure-tight space is axially delimited at an upper end of the pressure-tight space that is formed by a lower surface of the end cover;

the housing (5) is formed as a recess in either a wheel carrier or a guiding element;

the joint cup (4) captively retains the head area (3) of the pivot pin (2) in an axially central position within the housing (5) such that the center point of the head area (3) is fixed along the longitudinal axis at a set distance from the inner surface of the laterally surrounding wall of the housing (5) and is slidable from the central position axially along a stroke path of between about 2 to 5 millimeters; and the pressure-tight space (6) is filled with grease to a volume of 25 to 50%.

11. The articulation device (1) according to claim 1, wherein the articulation device (1) is connected to at least one of a chassis component and a steering component of a motor vehicle.

12. An articulation device (1) comprising:

a pivot pin (2) having a head (3) which is supported within a housing (5), the head of the pivot pin is spherical and has a center point and upper and lower portions, the upper portion of the head, which is opposite the pivot pin, is semispherical, the housing (5) defines a central axis and has first and second axial ends, the pivot pin (2) extends through the first axial end of the housing (5) and the head of the pivot pin is axially movable between the first and the second axial ends of the housing, a cover (9) is fixed to and encloses the second axial end of the housing (5), an annular joint cup (4) comprises a radially inner surface which engages and captively surrounds the head (3), and a radially outer surface which engages an interior surface of the housing (5) such that the joint cup (4) pivotably supports the head (3) of the pivot pin (2) within the housing (5) such that the center point of the head of the pivot pin is fixed along the central axis, the cover (9) has a convex curvature (11) which curves inwardly from the second axial end of the housing toward the head (3) and increases rigidity of the cover (9), the convex curvature (11) directly abuts the head (3) to stop axial movement of the head (3) away from the first axial end of the housing, engagement between the housing and the joint cup (4) and between the joint cup and the head forms a seal in an interior space of the housing between the first axial end and the second axial end of the housing (5), axially between the joint cup and the second axial end of the housing, a pressure tight space is axially delimited by the cover, an upper surface of the joint cup (4) and a surface of the upper portion of the head of the pivot pin, the interior surface of the housing radially delimits the pressure-tight space, the pressure-tight space (6) contains a compressible fluid such that axial movement of the joint cup (4) and the head (3) of the pivot pin (2) toward the second axial end of the housing (5) compresses the fluid and limits the axial movement of the joint cup (4) and the head (3) of the pivot pin (2), and the surface of the upper portion of the head of the pivot pin is directly exposed to the pressure-tight space and the compressible fluid contained therein such that the compressible fluid lubricates the engagement between the radially inner surface of the joint cup and the head of the pivot pin when the head of the pivot pin rotates therein about the center point.

13. The articulation device (1) according to claim 12, wherein the joint cup (4) is made from a rigid material, only the joint cup (4) is located radially between the housing (5) and the head (3) of the pivot pin (2) to fix the center point of the head (3) of the pivot pin (2) on the central axis at a set distance from the housing (5), and edges of the upper surface of the joint cup abuts the interior surface of the housing and a portion of the upper surface of the head of the pivot pin.

14. The articulation device (1) according to claim 13, wherein the rigid material is made from at least one of a fiber-reinforced plastic, PA, POM, PBT, PEEK, hardened steel, an alloy of a non-ferrous metal, and copper.

15. The articulation device (1) according to claim 12, wherein the fluid contained within the pressure-tight space (6) is grease.

\* \* \* \* \*